Dec. 31, 1963  M. B. PREEMAN  3,116,051
MOBILE MIXING PLANT
Filed May 11, 1961  5 Sheets-Sheet 1
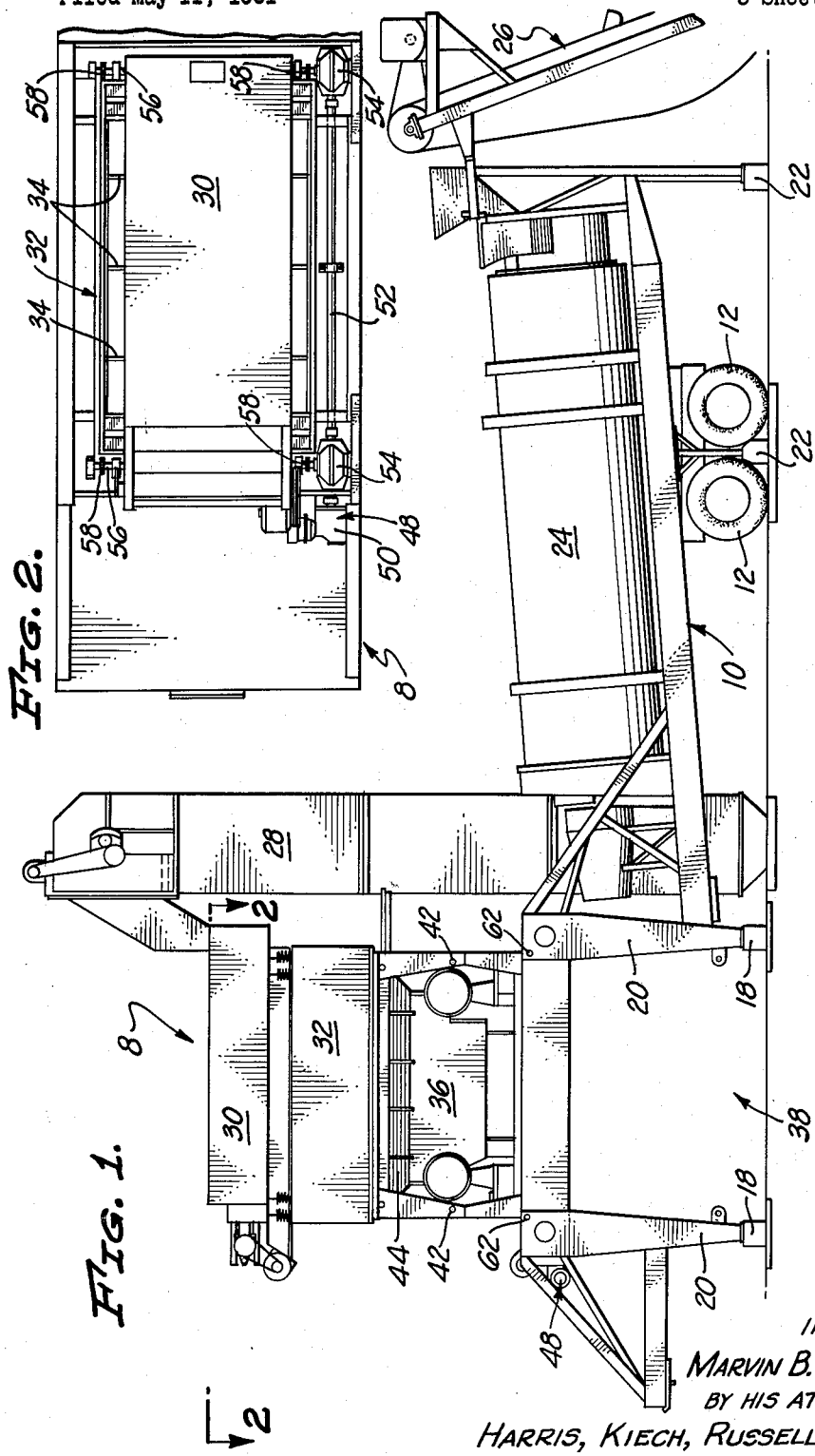
INVENTOR
MARVIN B. PREEMAN
BY HIS ATTORNEYS
HARRIS, KIECH, RUSSELL & KERN

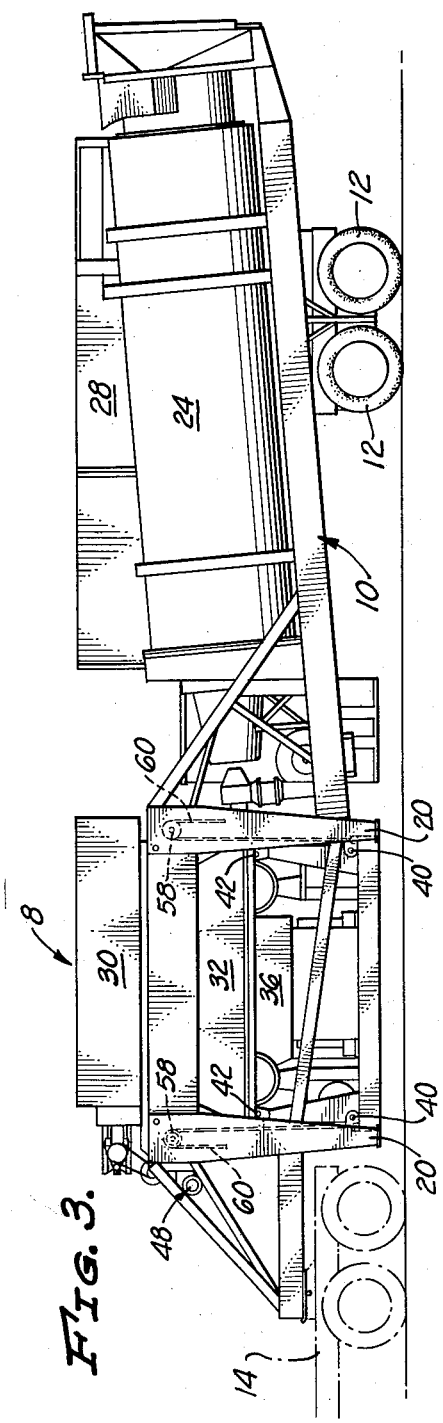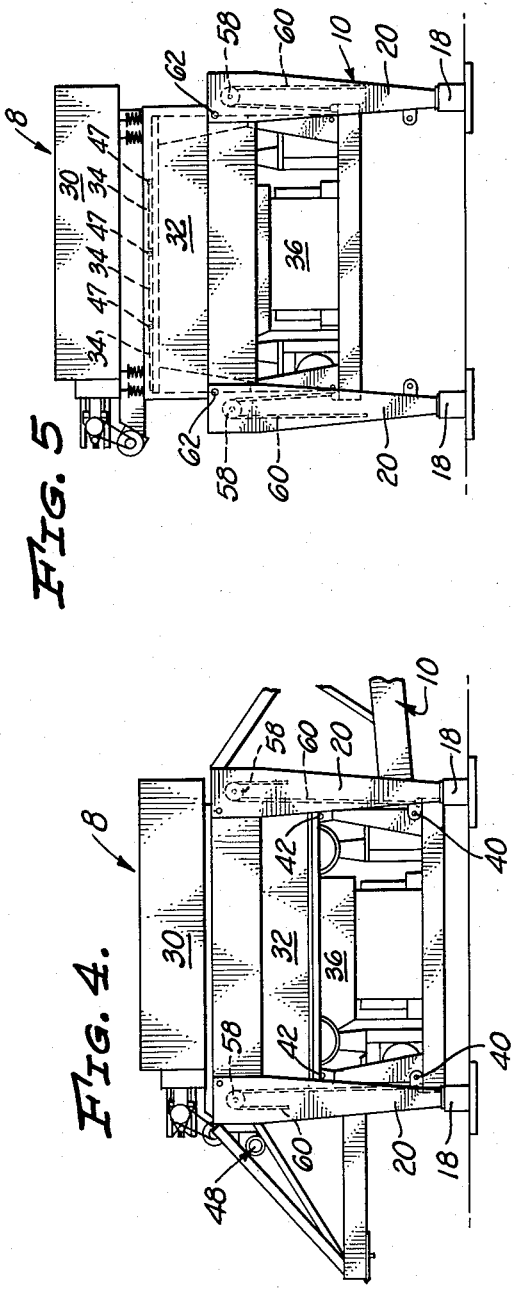
INVENTOR
MARVIN B. PREEMAN
BY HIS ATTORNEYS
HARRIS, KIECH, RUSSELL & KERN Dec. 31, 1963 M. B. PREEMAN 3,116,051
MOBILE MIXING PLANT
Filed May 11, 1961 5 Sheets-Sheet 3
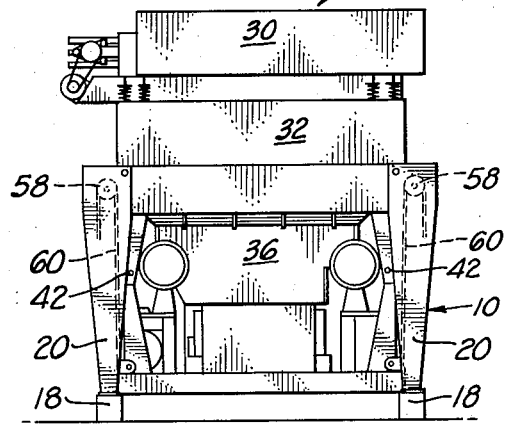
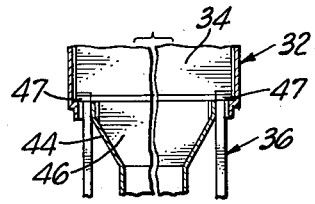
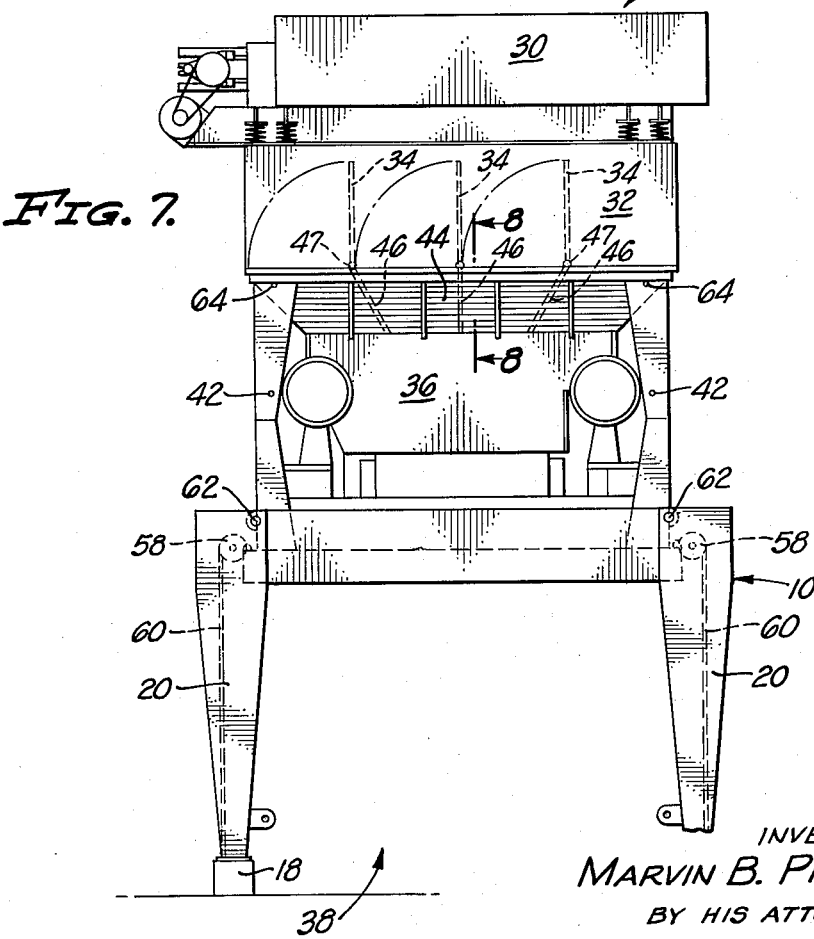
INVENTOR
MARVIN B. PREEMAN
BY HIS ATTORNEYS
HARRIS, KIECH, RUSSELL & KERN Dec. 31, 1963    M. B. PREEMAN    3,116,051
MOBILE MIXING PLANT
Filed May 11, 1961    5 Sheets-Sheet 4

INVENTOR
MARVIN B. PREEMAN
BY HIS ATTORNEYS
HARRIS, KIECH, RUSSELL & KERN

Dec. 31, 1963  M. B. PREEMAN  3,116,051
MOBILE MIXING PLANT
Filed May 11, 1961  5 Sheets-Sheet 5

INVENTOR
MARVIN B. PREEMAN
BY HIS ATTORNEYS
HARRIS, KIECH, RUSSELL & KERN

United States Patent Office 3,116,051
Patented Dec. 31, 1963

3,116,051
MOBILE MIXING PLANT
Marvin B. Preeman, Los Angeles, Calif., assignor to Standard Steel Corporation, Los Angeles, Calif., a corporation of California
Filed May 11, 1961, Ser. No. 109,397
5 Claims. (Cl. 259—153)

The present invention relates in general to a mobile or portable material processing plant and, more particularly, to a mobile mixing plant capable of producing asphalt mixes for paving projects, for example.

As disclosed in my Patent No. 2,805,052, granted September 3, 1957, a mobile mixing plant of the general type to which the invention relates comprises a mobile base section or chassis carrying the various components essential to the operation of the plant. Among these components are an aggregate heater and dryer, an elevator for elevating the heated and dried aggregates discharged by the dryer to a grading section, e.g., a screen section, a bin or storage section below the grading section, and a weighing and mixing section below the storage section. Aggregates from the storage section are weighed out in the mixing section and are mixed with asphalt, or the like, therein. Subsequently, the asphalt mix is discharged from the mixing section into a truck, or the like, therebeneath.

In a mobile mixing plant of the foregoing type, it is conventional to lower various components, including the grading, storage and mixing sections mentioned, into retracted positions relative to the base section to reduce the over-all height of the plant for transport.

A primary object of the present invention is to provide a mobile mixing plant wherein the base, mixing, storage and grading sections are so related as to minimize the over-all height of the plant for transport purposes while maintaining sufficient height during normal operation to provide the mixing, storage and grading sections with adequate capacities.

More particularly, an important object of the invention is to provide a mobile mixing plant wherein the storage section is telescopically related to either the mixing section or the grading section so that the two sections can be telescoped together in the vertical direction to reduce the over-all height of the plant for transport purposes, while maintaining the desired large grading, storage and mixing section capacities.

More particularly, an object of the invention is to provide a storage section adapted to have either the grading section or the mixing section telescoped vertically thereinto for transport purposes. In this connection, an object is to provide bin dividers, for dividing the storage section into a plurality of compartments or bins in normal operation, which are retractable into generally horizontal, inoperative positions to permit telescoping the grading section or the mixing section into the storage section, or, conversely, to permit telescoping the storage section onto the grading section or the mixing section.

The foregoing objects, advantages, features and results of the present invention, together with various other objects, advantages, features and results thereof which will be evident to those skilled in the art to which the invention relates in the light of this disclosure, may be achieved with the exemplary embodiments of the invention described in detail hereinafter and illustrated in the accompanying drawings, in which:

FIG. 1 is a side elevational view of one embodiment of the mobile mixing plant of the invention in erected condition;

FIG. 2 is an enlarged, fragmentary plan view taken as indicated by the arrowed line 2—2 of FIG. 1;

FIG. 3 is a view similar to FIG. 1, but showing the mobile mixing plant in transport condition;

FIG. 4 is a fragmentary side elevational view showing a base section of the plant set up for operation, but showing grading, storage and mixing sections of the plant still in contracted or retracted positions;

FIG. 5 is a view similar to FIG. 4, but showing the grading, storage and mixing sections partially erected;

FIG. 6 is a view similar to FIG. 5, but showing the next step in the erection of the grading, storage and mixing sections;

FIG. 7 is an enlarged side elevational view similar to FIG. 6, but showing the grading, storage and mixing sections in their fully erected or extended positions;

FIG. 8 is a fragmentary sectional view taken along the arrowed line 8—8 of FIG. 7 of the drawings;

*Mixing Plant 8*

Figure 9:
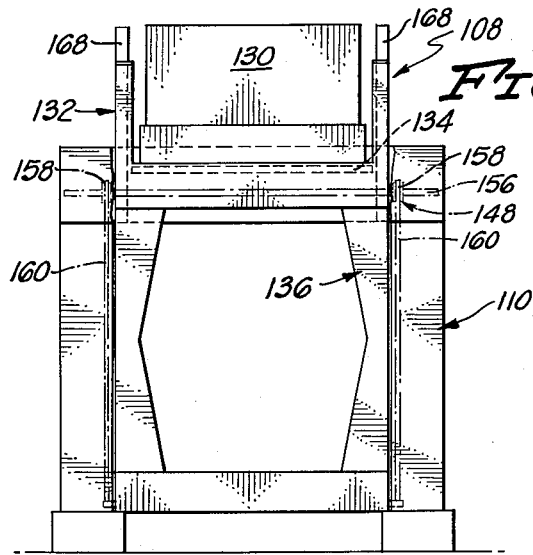
FIG. 9 is an end elevational view of another embodiment of the mobile mixing plant of the invention, showing a base section of the plant set up for operation, but showing grading, storage and mixing sections of the plant still in contracted or retracted positions.

Referring particularly to FIGS. 1 and 3 of the drawings, the embodiment of the mobile mixing plant of the invention illustrated therein is designated generally by the numeral 8 and includes a mobile, vehicular base section or chassis 10 in the form of a semitrailer. One end of the base section 10 is provided with wheels 12 and the other end thereof is adapted to be supported by a tractor 14, FIG. 3, during transit from one plant location to another. When the plant 8 is in operation, as shown in FIG. 1 of the drawings, the base section 10 may be mounted on blocks 18 placed under legs 20 of the base section, and on blocks 22 placed under the base section at other points. Once the base section 10 has been mounted on these blocks 18 and 22, the tractor 14 may be disconnected.

Mounted on the base section 10 of the plant 8 is an aggregate heater and dryer 24 which may be supplied with aggregates by a bucket conveyor 26. The dryer 24 discharges the dried and heated aggregates into an elevator 28. Normally, this elevator is in an upright position, as shown in FIG. 1 of the drawings. For transport purposes, however, the upper portion of the elevator 28 is swung downwardly into a generally horizontal position alongside the dryer 24, as shown in FIG. 3 of the drawings and as described in more detail in the aforementioned patent.

During normal operation of the plant 8, the elevator 28 discharges the dried and heated aggregates into an aggregate grading, e.g., screening, apparatus or section 30 resiliently seated on and discharging into a bin or storage section 32. The latter is divided into a plurality of bins or compartments for different aggregate grades by bin dividers 34, as shown in FIG. 7 of the drawings. Continuing to consider the mixing plant 8 in its erected condition, below the storage section 32 is a weighing and mixing section 36, which is sometimes referred to herein merely as a mixing section for convenience. As is conventional in mixing plants of this type, the mixing section 36 is adapted to weigh out aggregates from the storage section 32 and to mix them with asphalt so as to form a paving mix, for example. The resulting paving or other mix may be discharged into a dump truck, not shown, driven under the mixing section 36 through a lateral or transverse vehicular passageway 38 between the legs 20 of the base section 10. Preferably, there are four of the legs 20 respectively located at the corners of the passageway 38.

Except as hereinafter described, the foregoing general components of the mixing plant 8, including the dryer 24, the conveyor 26, the elevator 28, the grading section 30, the storage section 32 and the mixing section 36, are all conventional. Consequently, detailed descriptions of these components are not required, it being necessary only to consider the manner in which the base section 10, the mixing section 36 and the storage section 32 are telescopically interrelated to permit reducing the height of the mixing plant 8 for transport purposes from that shown in FIGS. 1 and 7 of the drawings to that shown in FIGS. 3 and 4 thereof.

When the mixing plant 8 is in its transport condition, the mixing section 36 is telescoped downwardly into the base section 10. In effect, the base section 10 provides a vertical shaft for the mixing section 36 which intersects the transverse passageway 38 and the corners of which are formed by the legs 20 of the base section. For transport purposes, the mixing section 36 is suitably secured to the base section 10 with the mixing section in its lowermost position, as shown in FIGS. 3 and 4. For example, the mixing section 36 may be secured to the base section 10 by pins 40 respectively connecting the corners of the mixing section to the legs 20. The pins 40 appear in FIGS. 3 and 4 of the drawings.

To reduce the over-all height of the mixing plant 8 for transport purposes, the storage section 32 is telescopically connected to the mixing section 36, in addition to telescopically connecting the mixing section to the base section 10. More particularly, the storage section 32 telescopes downwardly over the mixing section 36, as will readily be apparent from a comparison of FIGS. 4 and 7 of the drawings, for transport purposes. When the storage section 32 is in its lowermost position relative to the mixing section 36, the storage section rests on lugs 42 on the mixing section, as shown in FIGS. 3 and 4 of the drawings.

To permit the foregoing telescoping of the storage and mixing sections 32 and 36 into the relatively contracted positions thereof shown in FIGS. 3 and 4, the bin dividers 34 must be so located and mounted that they can be moved into inoperative positions wherein they do not obstruct the desired telescopic contraction of the storage and mixing sections. With this in view, the upper end of the mixing section 36 is provided with a hopper structure 44 which forms the bottom of the storage section 32 when the storage and mixing sections are in their relatively extended positions. The hopper structure 44 is provided with fixed bin dividers 46 and the previously-mentioned bin dividers 34 form upward continuations of the fixed bin dividers 46 and are pivotally connected to the hopper structure 44, by pivots 47, about transverse horizontal axes so that they may be moved between upright, operative positions, as shown in FIG. 7 of the drawings, and generally horizontal, inoperative positions, as shown in FIG. 5. As will be apparent, by pivoting the movable bin dividers 34 downwardly into their generally horizontal positions, the storage section 32 may be telescoped downwardly over the mixing section 36. Any suitable means, not shown, may be provided for retaining the pivoted bin dividers 34 in their generally vertical, operating positions.

The mobile mixing plant 8 of the invention includes elevating means, designated generally by the numeral 48, for raising and lowering the mixing section 36, and for also relatively vertically moving the mixing section and the storage section 32 between their relatively contracted positions and their relatively extended positions. As best shown in FIG. 2 of the drawings, the elevating means 48 includes a motor 50 on the base section 10 which drives a longitudinal shaft 52 thereon. Gear units 54 connect the longitudinal shaft 52 to lateral or transverse shafts 56 carried by the base section 10 on opposite sides of the transverse passageway 38. The transverse shafts 56 are located adjacent the upper ends of the legs 20 and each carries two sprockets 58 adjacent its respective ends. Chains 60 are trained over the respective sprockets 58 and are connected to the respective corners of the mixing section 36 adjacent the bottom thereof. The opposite ends of the chains 60 merely hang downwardly from the respective sprockets 58 within the respective legs 20, which are preferably angle-shaped in horizontal cross section.

Operation of Plant 8

Considering the operation of the mixing plant 8, it will be assumed initially that the mixing section 36 is in its retracted position relative to the base section 10, wherein it is supported by the pins 40, and that the storage section 32 is in its retracted position relative to the mixing section, wherein it is supported by the lugs 42. Of course, the pivoted bin dividers 34 are in their generally horizontal, inoperative positions when the storage and mixing sections 32 and 36 are in their relatively contracted positions.

Under the foregoing conditions, the mixing plant 8 of the invention may be transported readily to any desired site, as by means of the tractor 14, ample ground and overhead clearances being provided by virtue of the retraction of the various extensible and retractable components hereinbefore described.

Upon arrival at the desired site, the base section 10 is set up on the blocks 18 and 22, whereupon the tractor 14 may be disconnected. Next, the pins 40 are removed and the motor 50 is energized in a direction to cause the chains 60 to lift the mixing section 36 into the position shown in FIG. 5 of the drawings, which position is below the normal or operating position of the mixing section. This accomplished, the storage section 32 is temporarily connected to the base section 10, as by pins 62.

Then, the mixing section 36 is lowered, by means of the motor 50 and the chains 60, into its proper operating position relative to the storage section 32, this situation being shown in FIG. 6 of the drawings. At this stage, the storage and mixing sections 32 and 36 are connected together in their relatively extended positions, as by means of pins 64, FIG. 7.

Next, the motor 50 is energized in a direction to cause the chains 60 to lift the mixing section 36, with the storage section 32 thereon, into its operating position, as shown in FIGS. 1 and 7 of the drawings. The mixing section 36 may be secured to the base section 10 in its operating position in any suitable manner, as by means of the same pins 62 previously used to secure the storage section 32 in the FIG. 5 position temporarily.

It will be understood that at some time after relative telescopic movement of the storage and mixing sections 32 and 36 into their relatively extended position, the pivoted bin dividers 34 are moved into their operative positions and suitably secured therein.

Once the grading, storage and mixing sections 30, 32 and 36 have been erected in the foregoing manner, and the hinged section of the elevator 28 has been erected, the portable mixing plant 8 of the invention is ready for operation. The transport condition may be regained by reversing the foregoing operations.

Mixing Plant 108

Turning now to FIGS. 9 to 13 of the drawings, the embodiment of the mobile mixing plant of the invention illustrated therein is designated generally by the numeral 108. The mixing plant 108 is similar to the plant 8 and the components of the plant 108 are identified by reference numerals higher by one hundred than the reference numerals used to identify corresponding components of the plant 8. In view of the similarity between the two plants 8 and 108, the latter will not be described in as much detail as the former.

Figure 10:
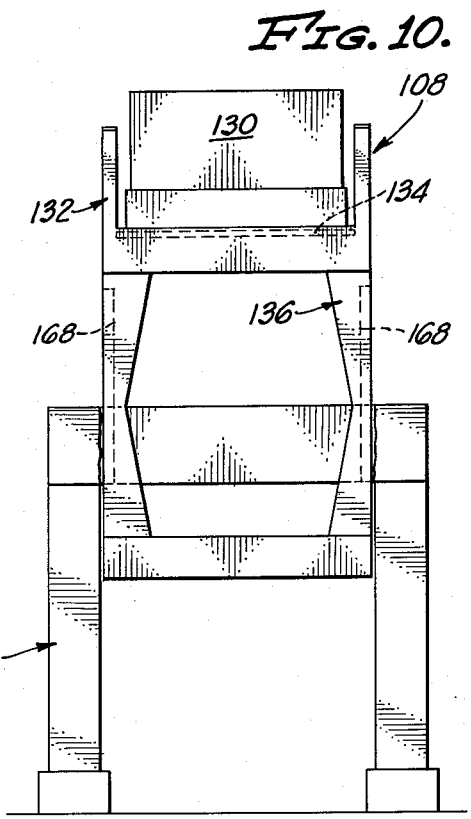
FIG. 10 is a view similar to FIG. 9, but showing the grading, storage and mixing sections partially erected.
Figure 12:
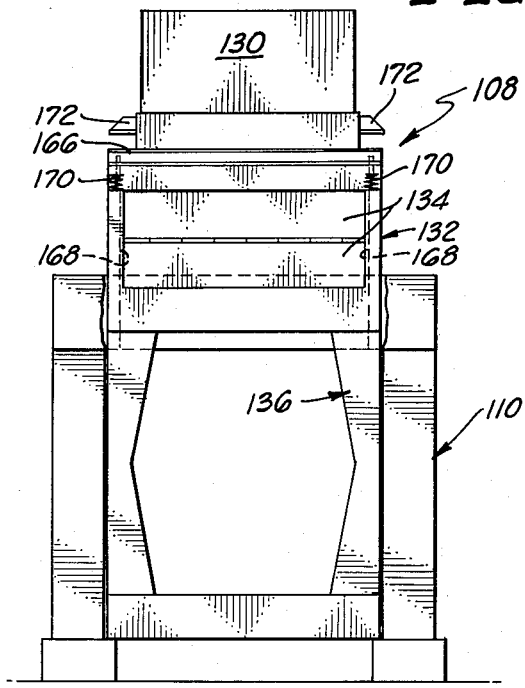
FIG. 12 is a view similar to FIG. 11, but showing the next step in the erection of the grading, storage and mixing sections.
Figure 13:
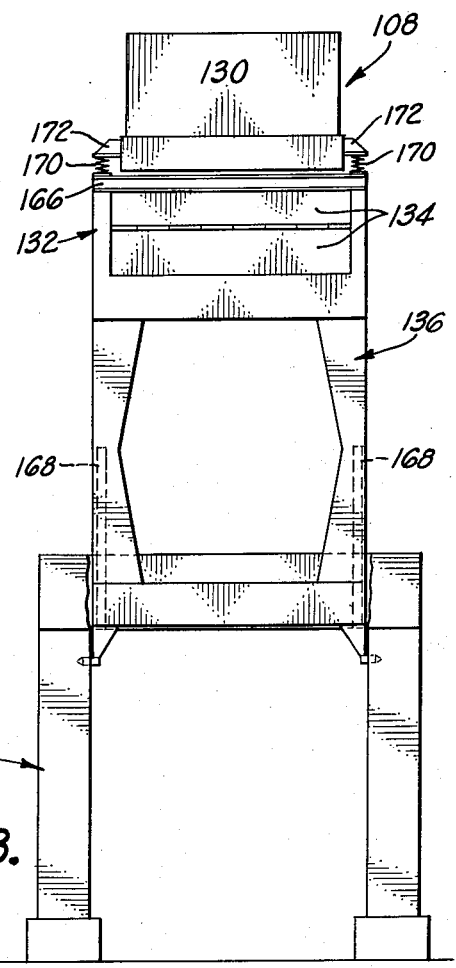
FIG. 13 is a view similar to FIG. 12, but showing the grading, storage and mixing sections in their fully erected or extended positions.

The mixing plant 108 includes base, grading, storage and mixing sections 110, 130, 132 and 136 respectively similar to the base, grading, storage and mixing sections 10, 30, 32 and 36. The storage section 132 is provided with bin dividers 134 which are movable between generally horizontal, retracted positions, wherein they are located at the bottom of the storage section 132 as shown in FIGS. 9 and 10, and generally vertical, extended positions, as shown in FIGS. 12 and 13. Preferably, the bin dividers 134 are foldable walls which are pivotable between their extended and retracted positions, although they may be of any suitable construction and a further description herein is unnecessary.

As in the case of the mixing plant 8, when the mixing plant 108 is in its transport condition, the mixing section 136 is telescoped downwardly into the base section 110, as shown in FIG. 9 of the drawings. To reduce the over-all height of the mixing plant 108 for transport purposes, the grading section 130 is telescoped downwardly into the storage section 132, the bin dividers 134 being in their retracted positions under such conditions.

Thus, the principal difference between the mixing plants 8 and 108 is that, in the plant 8, the mixing section 36 is telescoped into the storage section 32, while in the plant 108, the grading section 130 is telescoped into the storage section 132, the foregoing applying to the transport condition in each instance.

The mobile mixing plant 108 of the invention includes elevating means, designated generally by the numeral 148, for raising and lowering the mixing section 136, and for also relatively vertically moving the storage section 132 and the grading section 130 between their relatively contracted positions and their relatively extended positions. As shown in FIG. 9 of the drawings, the elevating means 148 may include lateral or transverse shafts 156, only one of which is visible, carried by the base section 110. Each transverse shaft 156 carries two sprockets 158 over which are trained chains 160 having ends connected to corresponding corners of the mixing section 136. The shafts 156 may be driven in any suitable manner, not shown.

*Operation of Plant 108*

Considering the operation of the mixing plant 108, it will be assumed initially that the base section 110 has been moved into its desired location and that the grading and mixing sections 130 and 136 are in their retracted positions wherein they are telescoped downwardly into the storage and base sections 132 and 110, respectively, as shown in FIG. 9 of the drawings. Suitable means, not shown, may be employed for securing the grading section 130 to the storage section 132 and for securing the mixing section 136 to the base section 110. For example, such securing means may be similar to those described in connection with the storage section 32 and the mixing section 36.

With the conditions obtaining in FIG. 9 of the drawings, the elevating means 148 is actuated, as by means of a motor, not shown, corresponding to the motor 50, to elevate the mixing, storage and grading sections 136, 132 and 130 into the positions shown in FIG. 10 of the drawings. As this is done, the grading section 130 remains telescoped into the storage section 132.

Figure 11:
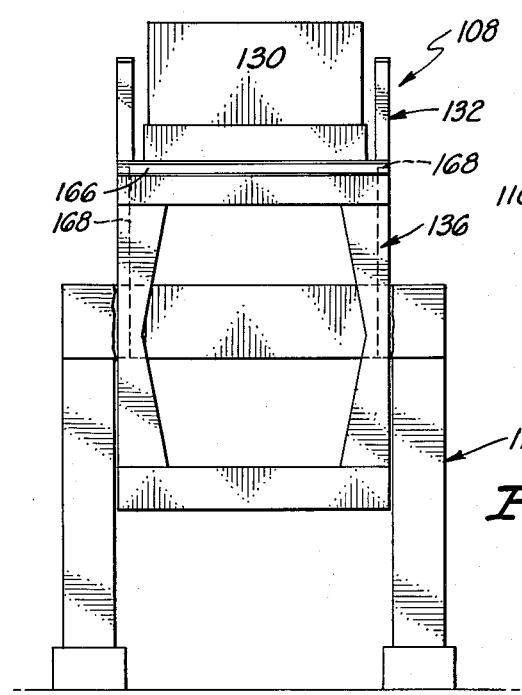
FIG. 11 is a view similar to FIG. 10, but showing the next step in the erection of the grading, storage and mixing sections.

The next step is to suitably attach grading-section supporting beams 166, only one of which is visible, to grading-section supporting posts 168 that project upwardly from the base section 110, as shown in FIG. 11 of the drawings. The mixing section 136, with the storage section 132 mounted thereon, is then lowered, through the use of the elevating means 148, into the position shown in FIG. 11 and then into the position shown in FIG. 12.

Under such conditions, the grading section 130 is temporarily supported by the beams 166 and the posts 168 and, as the mixing and storage sections 136 and 132 are lowered, the effect is to relatively telescopically extend the grading and storage sections 130 and 132, as shown in FIG. 12.

The next step is to mount the grading section 130 on top of the storage section 132, preferably resiliently so that the grading section can be operated as a shaker, as is well known in the art. To accomplish this, springs 170 are suitably mounted on top of the storage section 132 and spring brackets 172 are mounted on the grading section 130, as shown in FIG. 12 of the drawings. Also, the bin partitions 134 may be moved into their extended positions as shown in this figure.

Finally, as shown in FIG. 13 of the drawings, the elevating means 148 is actuated to raise the mixing section 136 and the storage section 132, which causes the springs 170 to engage the spring brackets 172 to support the grading section 130 on top of the storage section 132. The upward movement of the mixing section 136 by use of the elevating means 148 is continued until the grading, storage and mixing sections 130, 132 and 136 are all in their erected positions, the mixing section then being secured to the base section 110. As shown in FIG. 13, the temporary grading-section supporting beams 166 may be used to tie the sides of the storage section 132 together at the top of such section.

The foregoing accomplished, the portable mixing plant 108 of the invention is ready for operation. As will be apparent, the plant 108 may be restored to its transport condition by reversing the operations described.

*Summary and Conclusion*

Thus, it will be seen that the present invention provides a mobile mixing plant which may be knocked down, moved, and set up again with a minimum expenditure of time and effort. Because of the telescopic relation between the storage and mixing sections, or the grading and storage sections, the various sections may be provided with large capacities, while still keeping the over-all height of the mixing plant at a minimum for transport purposes, which is an important feature.

Although exemplary embodiments of the invention have been disclosed herein for purposes of illustration, it will be understood that various changes, modifications and substitutions may be incorporated in such embodiments without departing from the spirit of the invention as defined by the claims which follow.

I claim:

1. In a mobile mixing plant, the combination of: a mobile base section; a vertically movable mixing section telescopically connected to said base section; a vertically movable storage section connected to said mixing section; bin dividers carried by said storage section and dividing the interior of said storage section into compartments and capable of being placed in inoperative positions wherein they are removed from at least a portion of the interior of said storage section so that such portion is free of obstruction; a vertically movable grading section connected to said storage section, said storage section being telescopically connected to and being adapted to receive in said portion thereof one of said grading and mixing sections when said bin dividers are placed in their inoperative positions; means for relatively vertically moving said storage section and said one of said grading and mixing sections which is telescopically connected thereto, between relatively contracted and relatively extended positions; and means for vertically moving said mixing section relative to said base section between a lower, retracted position and an upper, extended position.

2. In a mobile mixing plant, the combination of: a mobile base section; a vertically movable mixing section telescopically connected to said base section; a vertically movable storage section telescopable over said mixing section; a vertically movable grading section connected to said storage section; means for relatively vertically moving said mixing and storage sections between relatively contracted and relatively extended positions; bin dividers carried by said storage section and movable relative thereto between generally horizontal and generally vertical positions, said bin dividers dividing said storage section into separate bins when they are in their generally vertical positions and when said mixing and storage sections are in their relatively extended positions, said bin dividers permitting relative vertical telescopic movement of said mixing and storage sections into their relatively contracted positions when said bin dividers are in their generally horizontal positions; and means for vertically moving said mixing section relative to said base section between a lower, retracted position and an upper, extended position.

3. In a mobile mixing plant, the combination of: a mobile base section; a vertically movable mixing section telescopable into said base section; a vertically movable storage section telescopable over said mixing section; a vertically movable grading section connected to said storage section; means for relatively vertically moving said mixing and storage sections between relatively contracted and relatively extended positions; bin dividers carried by said storage section and movable relative thereto between generally horizontal and generally vertical positions, said bin dividers dividing said storage section into separate bins when they are in their generally vertical positions and when said mixing and storage sections are in their relatively extended positions, said bin dividers permitting relative vertical telescopic movement of said mixing and storage sections into their relatively contracted positions when said bin dividers are in their generally horizontal positions; and means for vertically moving said mixing section relative to said base section between a lower, retracted position and an upper, extended position.

4. In a mobile mixing plant, the combination of: a mobile base section; a vertically movable mixing section telescopically connected to said base section; a vertically movable storage section connected to said mixing section; a vertically movable grading section telescopable into said storage section; means for relatively vertically moving said grading and storage sections between relatively contracted and relatively extended positions; bin dividers carried by said storage section and movable relative thereto between generally horizontal and generally vertical positions, said bin dividers dividing said storage section into separate bins when they are in their generally vertical positions and when said grading and storage sections are in their relatively extended positions, said bin dividers permitting relative vertical telescopic movement of said grading and storage sections into their relatively contracted positions when said bin dividers are in their generally horizontal positions; and means for vertically moving said mixing section relative to said base section between a lower, retracted position and an upper, extended position.

5. In a mobile mixing plant, the combination of: a mobile base section; a vertically movable mixing section telescopable into said base section; a vertically movable storage section connected to said mixing section; a vertically movable grading section telescopable into said storage section; means for relatively vertically moving said grading and storage sections between relatively contracted and relatively extended positions; bin dividers carried by said storage section and movable relative thereto between generally horizontal and generally vertical positions, said bin dividers dividing said storage section into separate bins when they are in their generally vertical positions and when said grading and storage sections are in their relatively extended positions, said bin dividers permitting relative vertical telescopic movement of said grading and storage sections into their relatively contracted positions when said bin dividers are in their generally horizontal positions; and means for vertically moving said mixing section relative to said base section between a lower, retracted position and an upper, extended position.

References Cited in the file of this patent
UNITED STATES PATENTS

| | | |
|---|---|---|
| 2,190,044 | Pollitz | Feb. 13, 1940 |
| 2,298,160 | Pollitz | Oct. 6, 1942 |